April 11, 1950   D. L. WOOD ET AL   2,503,789
FOCUSING OBJECTIVE LENS
Filed Sept. 21, 1946

DONALD L. WOOD
GEORGE H. AKLIN
INVENTORS

BY
ATT'Y & AG'T

Patented Apr. 11, 1950

2,503,789

UNITED STATES PATENT OFFICE 2,503,789

FOCUSING OBJECTIVE LENS

Donald L. Wood and George H. Aklin, Rochester, N. Y., assignors to Eastman Kodak Company, Rochester, N. Y., a corporation of New Jersey Application September 21, 1946, Serial No. 698,518

4 Claims. (Cl. 88—57)

This invention relates to objective lenses for cameras and to a novel means of focusing the camera.

The primary objects of the invention are to provide a highly convenient and practical means of focusing a camera and to provide an objective suitable for focusing in this novel manner.

A camera, incorporating a modification of the invention is described in a patent application, Ser. No. 620,806, by Wood and Silberstein, filed October 6, 1945, and in a division thereof, Ser. No. 688,826, filed August 7, 1946, now abandoned, and a highly corrected objective designed for use in such cameras is described as Example I in an application, Ser. No. 698,552, filed concurrently herewith by George H. Aklin, now Patent No. 2,446,402, issued August 3, 1948.

Heretofore it has been the universal custom to focus cameras for various object distances by moving the entire objective relative to the focal plane or by moving a front element relative to the rest of the objective. Moving the whole objective usually necessitates an expensive mechanism, and the front focusing type was evolved to eliminate this drawback. The use of either method involves looking at a scale on the front of the camera while making the adjustment. As long as the diaphragm and shutter scales were likewise mounted in the front, and before the introduction of the coupled rangefinder, the inconvenience was not intolerable and this arrangement became so habitual that even since coupled rangefinders were introduced it is still considered natural to make cameras with the focusing adjustment in front for use while the operator is behind the camera looking through the rangefinder.

According to the present invention a more convenient means of focusing a camera is provided by mounting a front portion of the objective at a fixed distance from the focal plane and axially adjusting a rear portion of the objective by a simple mechanism extending outside the camera body in a convenient location near or at the back of the camera.

Preferably only a single lens element, the rearmost one, is adjusted. It is also preferable that the fixed front portion of the objective have positive power and the rear movable portion have negative power. Generally speaking, better results have been obtained by the latter arrangement, and it involves a relatively smaller range of movement of the rear portion of the objective. A movable positive element may be used but is less satisfactory since greater movement of the element is required and this is accompanied by wide variations in the various aberrations of the system.

The advantages of the invention will be readily apparent. The greater convenience of operation has already been mentioned. The well known disadvantages of moving the whole objective are avoided. The moving parts are enclosed and protected from dirt and only the manually operated knob or lever extends outside the camera body. The whole arrangement makes it easy to give a more pleasing appearance to the camera as a whole. All these advantages derive from the novel arrangement whereby the rear portion of the objective is focused while the front remains stationary.

Figure 1:
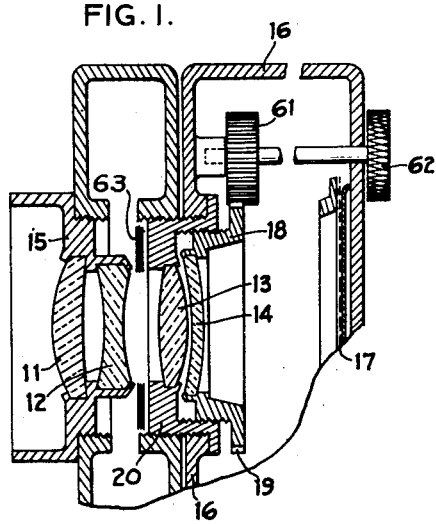
Fig. 1 shows an objective mounted in accordance with the invention.

In Figure 1 the objective is of the type described in the above mentioned copending application No. 698,552, and consists of four lens elements 11, 12, 13, 14, alternating in sign from a positive element 11 in the front to a negative element 14 in the rear. The front three elements are mounted in rings 15 and 20 in the customary way with the shutter blades 63 between two of the elements and are in a fixed position relative to the body 16 of the camera, that is fixed relative to the focal plane 17, that is the film plane. The rear element 14 is mounted in a ring 18 which is accurately threaded in the fixed ring 20 so that axial movement of the element results from rotation of the ring 18. The ring 18 is provided with gear teeth 19 around the periphery and is rotated by the mechanism 61 when the knob 62 on the outside of the camera body is turned. This mechanism is described in greater detail in the copending application 620,806. The invention permits great flexibility in the details of the mechanism so that it is easy to locate the knob in a very convenient location on the camera body.

Figure 2:
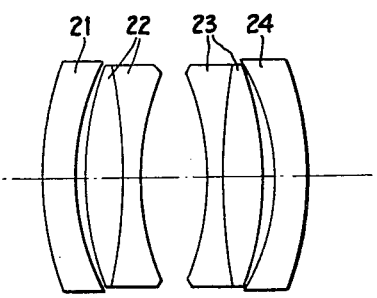
Fig. 2 to 5 show other objectives which can be similarly mounted.

Fig. 2 shows a nearly symmetrical objective consisting of two positive meniscus doublets 22, 23, axially spaced between two negative meniscus elements 21, 24, all four components being concave toward the center of the lens.

Figure 3:
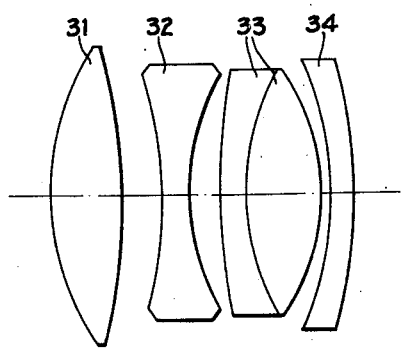
Figure 4:
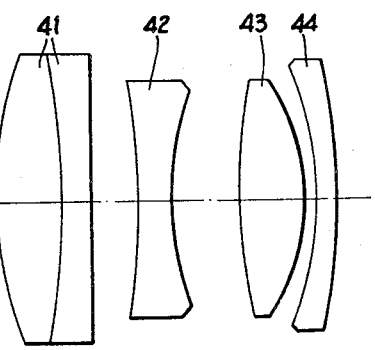

Figs. 3 and 4 show lenses which are like that of Fig. 1 as regards the signs of the respective components but differ in that the third component 33 and the first component 41, respectively, are compound, while the remaining components, 31, 32, 34, 42, 43 and 44 are simple elements.

Figure 5:
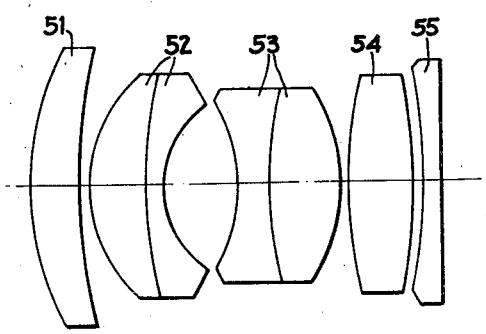

Fig. 5 shows a more elaborate objective comprising a positive meniscus element 51 followed by two compound negative menisci 52, 53 a biconvex element, 54, and a plano-concave element 55, in that order. An elaborate lens of this type has better zonal spherical aberration and may be used at larger relative apertures.

In accordance with a preferred form of the invention all of the five objectives shown are focused by moving the negative rear component. It may be noted also that in all the examples shown the positive front portion of the objective is biconvex in outward form. This feature is not an essential part of the invention, but the best results up to the present time have been obtained by using this arrangement. Similarly, best results have been obtained when the front surface of the negative rear component is concave.

It may also be pointed out that best results are obtained by designing the objective so that it is corrected at intermediate object distances. It is then slightly overcorrected for spherical aberration when the rear component (if negative) is moved closer to the front of the objective for distant objects, and under corrected when moved back for near objects. In this way the best balance is maintained and the aberration is close to the optimum correction throughout.

The invention applies only to objectives suitable for use as camera lenses, and in such lenses it is preferable that the components be close together. For the sake of definiteness it may be said that the airspace between the two portions of the lens should be less than one-fifth the focal length of the objective, and preferably less than one-tenth, when the objective is adjusted to focus a very distant object.

What we claim is:

1. A mounted photographic objective which in common with ordinary objectives is substantially corrected for a long conjugate on one side referred to as the front thereof and has its principal planes axially between its vertices, and which consists of a front portion of positive power and a rear portion of negative power which is axially adjustable with respect to the positive portion, means for mounting the front positive portion at a fixed distance from the focus plane of the objective, an adjustable mount for holding the rear portion coaxial with the front portion and means engaging the latter mount for adjusting said rear component axially relative to the mounting means for the front portion and for focusing the objective on said focus plane at a fixed distance behind said front portion.

2. An objective according to claim 1 in which the negative rear portion is a single lens element.

3. A mounted photographic objective which in common with ordinary objectives is substantially corrected for a long conjugate on one side referred to as the front thereof and has its principal planes axially between its vertices and which is characterized by having at least four components, the rear one of which is negative and the remainder of which make up a front portion of positive power, means for mounting the components of the front portion in fixed relation to and coaxial with each other, an adjustable mount for holding the rear component coaxial with the front portion and means engaging the latter mount for adjusting said rear component relative to the mounting means for the front portion and for focusing the objective on a plane at a fixed distance behind said front portion when the long conjugate distance is changed.

4. An objective according to claim 3 in which said negative rear component is a single meniscus element concave to the front.

DONALD L. WOOD.
GEORGE H. AKLIN.

REFERENCES CITED

The following references are of record in the file of this patent:

UNITED STATES PATENTS

| Number | Name | Date |
| --- | --- | --- |
| 341,887 | Collison | May 18, 1886 |
| 461,609 | Gundlach | Oct. 20, 1891 |
| 465,409 | Knipe | Dec. 15, 1891 |
| 1,098,823 | Minor | June 2, 1914 |
| 1,168,873 | Florian | Jan. 18, 1916 |
| 1,463,132 | Graf | July 24, 1923 |
| 1,860,575 | Gehrke | May 31, 1932 |
| 2,203,368 | Settel et al. | June 4, 1940 |
| 2,271,227 | Lee | Jan. 27, 1942 |
| 2,379,392 | Warmisham | June 26, 1945 |

FOREIGN PATENTS

| Number | Country | Date |
| --- | --- | --- |
| 21,211 | Great Britain | of 1901 |